United States Patent
Gaschler et al.

(10) Patent No.: US 10,927,194 B2
(45) Date of Patent: Feb. 23, 2021

(54) PROCESS FOR PREPARING AN AQUEOUS POLYMER DISPERSION HAVING HIGH CHEMICAL RESISTANCE

(71) Applicant: BASF SE, Ludwigshafen am Rhein (DE)

(72) Inventors: Wolfgang Gaschler, Ludwigshafen (DE); Sebastian Enck, Mannheim (DE); Leendert Berkhout, Emmen (NL); Linda Guitman, Zwolle (NL); Juergen Kaczun, Wachenheim (DE); David Hajnal, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 94 days.

(21) Appl. No.: 16/318,863

(22) PCT Filed: Jul. 6, 2017

(86) PCT No.: PCT/EP2017/066898
§ 371 (c)(1),
(2) Date: Jan. 18, 2019

(87) PCT Pub. No.: WO2018/015169
PCT Pub. Date: Jan. 25, 2018

(65) Prior Publication Data
US 2019/0263941 A1  Aug. 29, 2019

(30) Foreign Application Priority Data
Jul. 20, 2016 (EP) .................................. 16180296

(51) Int. Cl.
| | |
|---|---|
| *C08F 2/22* | (2006.01) |
| *C08K 3/013* | (2018.01) |
| *C08F 212/08* | (2006.01) |
| *C08F 220/18* | (2006.01) |
| *C08K 3/22* | (2006.01) |
| *C09D 5/02* | (2006.01) |
| *C08F 257/02* | (2006.01) |
| *C08F 265/06* | (2006.01) |

(52) U.S. Cl.
CPC .............. *C08F 2/22* (2013.01); *C08F 212/08* (2013.01); *C08F 220/18* (2013.01); *C08F 257/02* (2013.01); *C08F 265/06* (2013.01); *C08K 3/013* (2018.01); *C08K 3/22* (2013.01); *C09D 5/022* (2013.01); *C08F 220/1804* (2020.02); *C08F 220/1806* (2020.02); *C08K 2003/2241* (2013.01)

(58) Field of Classification Search
None
See application file for complete search history.

(56) References Cited

U.S. PATENT DOCUMENTS

| | | | |
|---|---|---|---|
| 4,013,607 | A | 3/1977 | Dwyer et al. |
| 4,269,749 | A | 5/1981 | Marriott et al. |
| 4,414,770 | A | 11/1983 | Brinton, Sr. |
| 4,529,787 | A | 7/1985 | Schmidt et al. |
| 4,546,160 | A | 10/1985 | Brand et al. |
| 2005/0032933 | A1 | 2/2005 | Hermes et al. |
| 2008/0075868 | A1 | 3/2008 | Dombrowski |
| 2013/0303674 | A1 | 11/2013 | Dombrowski et al. |
| 2015/0099843 | A1 | 4/2015 | Hartig et al. |

FOREIGN PATENT DOCUMENTS

| | | |
|---|---|---|
| DE | 32 25 876 A1 | 1/1984 |
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 386 325 A2 | 9/1990 |
| EP | 0 574 803 A2 | 12/1993 |
| EP | 0 771 328 | 12/1995 |
| EP | 1 333 074 A1 | 8/2003 |
| EP | 1 505 127 A1 | 2/2005 |
| EP | 1 732 962 B1 | 7/2008 |
| EP | 2 662 393 B1 | 8/2016 |
| WO | WO 2013/174894 A1 | 11/2013 |

OTHER PUBLICATIONS

International Search Report dated Oct. 13, 2017 on in PCT/EP2017/066898 filed on Jul. 6, 2017.

*Primary Examiner* — Robert T Butcher
(74) *Attorney, Agent, or Firm* — Oblon, McClelland, Maier & Neustadt, L.L.P.

(57) ABSTRACT

A process for producing aqueous polymer dispersions and the use thereof as binder for coatings having high solvent stability and a low tendency to soiling.

14 Claims, No Drawings

PROCESS FOR PREPARING AN AQUEOUS POLYMER DISPERSION HAVING HIGH CHEMICAL RESISTANCE

The present invention provides a process for producing an aqueous polymer dispersion by free-radically initiated aqueous emulsion polymerization, which comprises free-radically polymerizing, in an aqueous medium, in the presence of at least one polymer 1, ≤5.0% by weight of at least one α,β-monoethylenically unsaturated $C_3$ to $C_6$ mono- or dicarboxylic acid (monomers A2), ≥95% and ≤100% by weight of at least one ethylenically unsaturated compound other than the monomers A2 (monomers B2), where the amounts of monomers A2 and B2 add up to 100% by weight, with the proviso that the nature and amounts of monomers A2 and B2 are chosen such that the polymer 2 obtained therefrom has a Hansch parameter ≥2.80 and a glass transition temperature ≥20° C., the at least one polymer 1 comprises, in copolymerized form, ≥3.0% and ≤35% by weight of at least one α,β-monoethylenically unsaturated $C_3$ to $C_6$ mono- or dicarboxylic acid (monomers A1), and ≥65% and ≤97.0% by weight of at least one ethylenically unsaturated compound other than the monomers A1 (monomers B1), where the amounts of monomers A1 and B1 add up to 100% by weight, the nature and amounts of monomers A1 and B1 have been chosen here such that the at least one polymer 1 has a Hansch parameter >1.35, and the weight ratio of the at least one polymer 1 to the sum of the total amounts of monomers A2 and B2 (total amount of monomers 2) is in the range of 15:85 to 60:40.

The present invention further provides the aqueous polymer dispersions obtainable by the process of the invention, the polymer powders obtainable therefrom by drying, and the use of the aqueous polymer dispersions and of the polymer powders as binder for a wide variety of applications, especially for production of coatings having high solvent stability and low tendency to soiling or high resistance to staining.

The basis for the process of the invention or for the aqueous polymer dispersions of the invention is the prior art which follows.

For instance, EP-A 386325 discloses adhesive formulations which are produced using emulsion polymers which are prepared by emulsion polymerization of ethylenically unsaturated monomers in the presence of a polymer rich in carboxylic acid groups. The polymers rich in carboxylic acid groups comprise between 6% and 30% by weight of ethylenically unsaturated carboxylic acids, and 70% to 94% by weight of further ethylenically unsaturated compounds in copolymerized form. Further ethylenically unsaturated compounds mentioned include a multitude of different monomers, although the examples disclose solely polymers rich in carboxylic acid groups that comprise between 65% and 70% by weight of n-butyl acrylate in copolymerized form and therefore have Hansch parameters of well below 1.5. The glass transition temperatures of the emulsion polymers formed from the ethylenically unsaturated monomers are also all well below −10° C.

EP-A 574803 discloses the use of aqueous polymer dispersions comprising 5% to 80% by weight of a copolymer A having a glass transition temperature of 50 to 150° C. and 20% to 95% by weight of a copolymer B having a glass transition temperature of −50° C. to +50° C., where the glass transition temperatures of the two copolymers differ by at least 20° C. and where at least one copolymer has a content of 3% to 70% by weight of ethylenically unsaturated carboxylic acid in copolymerized form, as a sealable coating. The copolymer A preferably includes the copolymerized carboxylic acid. For the copolymers A and B, a multitude of possible comonomers are mentioned; in the examples, the copolymer A is prepared using 51.5% by weight of styrene or methyl methacrylate and copolymer B using n-butyl acrylate as main monomer, therefore resulting in Hansch parameters for the copolymers A in the region below 1.0 and glass transition temperatures for the copolymers B of well below 20° C.

EP-A 1333074 discloses aqueous printing ink formulations wherein the binder polymers are prepared by emulsion polymerization of ethylenically unsaturated compounds in the presence of a first polymer. Said first polymer is to comprise 15% to 75% by weight of ethylenically unsaturated carboxylic acids in copolymerized form and to have a Hansch parameter in the range from 1.3 to 2.1. However, it is significant in this connection that these Hansch parameter values were calculated by a different method than that used in this document. Employing the method used in this document, for the polymers obtained in the first stage, Hansch parameters in the range from 0.69 to 1.21 rather than 1.3 to 2.1 are obtained.

Moreover, US-A 2008/75868 discloses soiling-resistant coating compositions wherein the binder is a multistage emulsion polymer. It is essential that the first emulsion polymer comprises 0.5% to 5% by weight, preferably 1% to 4% by weight, of carboxylic acid monomer in copolymerized form and has a Hansch parameter >2.0. The second emulsion polymer is generally characterized in that it is to comprise less than half of the acid monomer content of the first emulsion polymer and in that the glass transition temperatures of the two polymer phases differ by not more than 20° C. It is significant in this connection that, according to the figures in table A, in all working examples, the glass transition temperatures both for the first emulsion polymer and for the second are well below 1° C. and the Hansch parameter for the second emulsion polymer is less than 2.6.

It was therefore an object of the present invention to provide alternative or improved binders for coatings having high solvent stability and low tendency to soiling or elevated resistance to staining.

The object was achieved by an aqueous polymer dispersion obtainable by the process defined at the outset.

It is an essential feature of the process that the free-radically initiated aqueous emulsion polymerization of monomers A2 and B2 takes place in the presence of at least one polymer 1, where the at least one polymer 1 comprises, in copolymerized form, ≥3.0% and ≤35% by weight of at least one α,β-monoethylenically unsaturated $C_3$ to $C_6$ mono- or dicarboxylic acid (monomers A1), and ≥65% and ≤97.0% by weight of at least one ethylenically unsaturated compound other than the monomers A1 (monomers B1), where the amounts of monomers A1 and B1 add up to 100% by weight, and the nature and amounts of monomers A1 and B1 have been chosen here such that the at least one polymer 1 has a Hansch parameter >1.35.

Useful monomers A1 include all α,β-monoethylenically unsaturated $C_3$ to $C_6$, preferably $C_3$ or $C_4$, mono- or dicarboxylic acids. The invention shall likewise encompass the fully or partly neutralized water-soluble salts, especially the alkali metal or ammonium salts, of the aforementioned carboxylic acids. Examples include acrylic acid, methacrylic acid, ethylacrylic acid, itaconic acid, allylacetic acid, crotonic acid, vinylacetic acid, fumaric acid, maleic acid, 2-methylmaleic acid, but also monoesters of ethylenically unsaturated dicarboxylic acids, such as monoalkyl maleates of $C_1$ to $C_8$ alcohols, and the ammonium, sodium or potassium salts of the aforementioned acids. The monomers A1 also include the anhydrides of corresponding α,β-monoethylenically unsaturated dicarboxylic acids, for example maleic anhydride or 2-methylmaleic anhydride. Monomer A1 is preferably selected from the group comprising acrylic acid, methacrylic acid, crotonic acid, fumaric acid, maleic acid, maleic anhydride, 2-methylmaleic acid and itaconic acid. According to the invention, however, acrylic acid and/or methacrylic acid are used particularly advantageously as monomers A1.

Useful monomers B1 include all ethylenically unsaturated monomers which are different than the monomers A1 and are copolymerizable therewith. Examples of useful monomers B1 include vinylaromatic compounds such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, preferably 2 to 12 carbon atoms, for example vinyl acetate, vinyl propionate, vinyl n-butyrate, vinyl laurate, and vinyl stearate, $C_1$- to $C_{12}$-alkyl vinyl ethers, such as methyl vinyl ether, ethyl vinyl ether, n-propyl vinyl ether, n-butyl vinyl ether, n-pentyl vinyl ether, n-hexyl vinyl ether, esters derived from α,β-monoethylenically unsaturated mono- and dicarboxylic acids having preferably from 3 to 6 carbon atoms, particular examples being acrylic acid, methacrylic acid, maleic acid, fumaric acid and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl and 2-ethylhexyl esters of acrylic acid and of methacrylic acid, the dimethyl or di-n-butyl esters of fumaric acid and of maleic acid, nitriles of α,β-monoethylenically unsaturated carboxylic acids, for example acrylonitrile, methacrylonitrile, fumaronitrile, maleonitrile, and also $C_{4-8}$ conjugated dienes, such as 1,3-butadiene (butadiene) and isoprene. The aforementioned monomers form generally ≥80% by weight, preferably ≥90% by weight and especially preferably ≥95% by weight of the total amount of all monomers B1, and thus constitute the main monomers B1. Preferably in accordance with the invention, polymer 1 comprises, as main monomer B1, an ester of acrylic acid or methacrylic acid with a $C_1$ to C12 alcohol, especially methyl acrylate, ethyl acrylate, n-butyl acrylate, 2-ethylhexyl acrylate or methyl methacrylate, a vinylaromatic compound, especially styrene or α-methylstyrene, a nitrile of an α,β-monoethylenically unsaturated carboxylic acid, especially acrylonitrile, and/or a vinyl ester of a $C_2$ to $C_{12}$ monocarboxylic acid in copolymerized form.

Further useful monomers B1, to a minor degree, are those ethylenically unsaturated monomers which comprise either at least one sulfo group and/or the corresponding anion thereof or at least one amino, amido, ureido or N-heterocyclic group and/or the nitrogen-protonated or alkylated ammonium derivatives thereof. Examples include acrylamide and methacrylamide; and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide, and 2-(1-imidazolin-2-onyl)ethyl methacrylate. The aforementioned monomers B1 are used generally in amounts of ≤10% by weight, preferably ≤5% by weight and especially ≤1% by weight, based in each case on the total amount of monomers B1.

Further monomers B1 usable in accordance with the invention are functionalized ethylenically unsaturated compounds selected from the group comprising acetoacetoxyethyl acrylate, acetoacetoxypropyl acrylate, acetoacetoxybutyl acrylate, acetoacetoxyethyl methacrylate, acetoacetoxypropyl methacrylate, acetoacetoxybutyl methacrylate, diacetoneacrylamide and diacetonemethacrylamide. The aforementioned monomers B1 are used generally in amounts of ≤15% by weight, preferably ≤8% by weight and especially ≤3% by weight, based in each case on the total amount of monomers B1.

Monomers B1 which typically increase the integrity of the films formed by a polymer matrix normally have at least one epoxy group, at least one carbonyl group, or at least two nonconjugated ethylenically unsaturated double bonds. Examples of these are monomers having two vinyl moieties, monomers having two vinylidene moieties, and also monomers having two alkenyl moieties. Particularly advantageous monomers here are the diesters of dihydric alcohols with α,β-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate, hexane-1,6-diol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, hexane-1,6-diol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. The aforementioned monomers B1 are used generally in amounts of ≤5% by weight, preferably 3% by weight and especially preferably ≤1.5% by weight, based in each case on the total amount of monomers B1.

However, monomers B1 used with preference are styrene, α-methylstyrene, methyl methacrylate, n-butyl acrylate and/or 2-ethylhexyl acrylate.

An essential feature of polymer 1 is that it has a Hansch parameter >1.35, advantageously ≥1.40 and ≤2.00 and particularly advantageously ≥1.50 and ≤1.90.

The Hansch parameters are generally a measure of the hydrophobicity of monomers M and the polymers P formed therefrom.

The theoretical considerations for the calculation of the Hansch parameters come from: Hansch, Fujita, J. Amer. Chem. Soc., 1964, 86, pages 1616-1626; H. Kubinyi, Methods and Principles of Medicinal Chemistry, Volume 1, R. Mannhold et al., publisher: VCH, Weinheim (1993); C. Hansch and A. Leo, Substituent Constants for Correlation Analysis, in Chemistry and Biology, Wiley, New York (1979); and C. Hansch, P. Maloney, T. Fujita, and R. Muir, Nature, 1962, 194, pages 178-180.

In the context of the present document, the Hansch parameters for the monomers are generally calculated with the "KOWWIN v1.68" (September 2010) software which is made available to the public by the US Environmental Protection Agency (EPA) as "Estimation Programs Interface Suite™ for Microsoft® Windows, v4.11" [2012], United States Environmental Protection Agency, Washington, D.C., USA. This program ascertained the Hansch parameters for the monomers A1 and A2 and monomers B1 and B2 that were among those used in this document. Since the polymers 1 used or the aqueous polymer dispersions obtained by the process advantageously have a pH in the neutral to slightly alkaline range, complete deprotonation was assumed for the monomers containing acid groups, and so the calculation was made with the salt specified in each case.

| Monomer | Calculated individual Hansch parameter |
|---|---|
| Maleic acid (as disodium maleate) | −5.21 |
| Itaconic acid (as disodium itaconate) | −5.60 |
| Vinylsulfonic acid (as sodium vinylsulfonate) | −4.17 |
| Acrylic acid (as ammonium acrylate) | −2.43 |
| Methacrylic acid (as ammonium methacrylate) | −1.89 |
| Hydroxyethyl acrylate | −0.25 |
| Hydroxyethyl methacrylate | 0.30 |
| Vinyl acetate | 0.73 |
| Ethyl acrylate | 1.22 |
| Methyl acrylate | 0.73 |
| Ureidomethacrylate | 0.41 |
| Acetoacetoxyethyl methacrylate | 0.24 |
| Styrene | 2.89 |
| α-Methylstyrene | 3.44 |
| Methyl methacrylate | 1.28 |
| n-Butyl acrylate | 2.20 |
| Isobutyl acrylate | 2.13 |
| Isobutyl methacrylate | 2.67 |
| Hexanediol diacrylate | 3.08 |
| 2-Ethylhexyl acrylate | 4.09 |
| 2-Ethylhexyl methacrylate | 4.64 |
| Butyl methacrylate | 2.75 |
| Isobornyl methacrylate | 4.76 |
| Lauryl acrylate | 6.13 |
| Lauryl methacrylate | 6.68 |
| Stearyl acrylate | 9.62 |
| Tetraethylene glycol diacrylate | 0.29 |
| Acrylonitrile | 0.21 |
| Allyl methacrylate | 2.12 |
| Butanediol diacrylate | 2.10 |
| Vinyltrimethoxysilane | −0.31 |
| Vinyltriethoxysilane | 1.16 |
| 3-Methacryloyloxypropyltrimethoxysilane | 0.75 |

The Hansch parameters are calculated for the polymers P formed from the monomers M generally by the following general formula:

$$HP_P = x_1 \cdot HP_{M1} + x_2 \cdot HP_{M2} + \ldots x_n \cdot HP_{Mn}$$

with $HP_P$: calculated Hansch parameter of the polymer P formed from the monomers M1, M2 ... Mn $x_1$,
$x_2$,
$x_n$: proportions by weight of the monomers M1, M2 ... Mn incorporated into the polymer P in percent divided by 100, where the sum total of $x_1 + x_2 + \ldots x_n = 1$ $HP_{M1}$,
$HP_{M2}$,
$HP_{Mn}$: the individual Hansch parameters calculated for each of the monomers M1, M2 ... Mn.

The Hansch parameter for a polymer formed, for example, from 15% by weight of ammonium acrylate and 85% by weight of styrene is therefore calculated as follows:

$$HP_P = x_{acrylate} \cdot HP_{acrylate} + x_{styrene} \cdot HP_{styrene}$$

$$HP_P = 0.15 \cdot -2.43 + 0.85 \cdot 2.89$$

$$HP_P = 2.09$$

Advantageously, the at least one polymer 1 therefore comprises, in copolymerized form, acrylic acid and/or methacrylic acid as monomers A1, and styrene, α-methylstyrene, methyl methacrylate, n-butyl acrylate and/or 2-ethylhexyl acrylate as monomers B1.

Advantageously in accordance with the invention, the at least one polymer 1 accordingly comprises ≥4.0% and ≤25% by weight of at least one monomer A1, preferably acrylic acid and/or methacrylic acid, and
≥75% and ≤96.0% by weight of at least one monomer B1, preferably styrene, α-methylstyrene, methyl methacrylate, n-butyl acrylate and/or 2-ethylhexyl acrylate, and particularly advantageously
≥6% and ≤20% by weight of at least one monomer A1, preferably acrylic acid and/or methacrylic acid, and
≥80% and ≤94% by weight of at least one monomer B1, preferably styrene, α-methylstyrene, methyl methacrylate, n-butyl acrylate and/or 2-ethylhexyl acrylate,
in copolymerized form.

The preparation of the at least one polymer 1 is known in principle to those skilled in the art and is effected by familiar free-radically or ionically initiated bulk, solution or emulsion polymerization processes. Suitable preparation processes are therefore disclosed, for example, in EP-A 1333074 in paragraph [0016], in the examples of EP-A 574803 [copolymer A], DE-A 3225876, and U.S. Pat. No. 4,013,607, 4,414,770, 4,529,787, 4,546,160 or EP-A 1732962. The at least one polymer 1 may therefore be in neat form (bulk) or be dissolved in a suitable solvent or dispersed in a suitable liquid medium. More preferably, the at least one polymer 1 is used in the form of a powder or granular material and more preferably in the form of an aqueous polymer solution, the corresponding carboxylic acid groups each having been neutralized by a base such as sodium hydroxide or potassium hydroxide and especially preferably ammonium hydroxide. According to the invention, it may also be advantageous to prepare the at least one polymer 1 as the first stage of a two-stage free-radically initiated aqueous emulsion polymerization, where the second stage corresponds to the preparation of polymer 2.

According to the invention, the at least one polymer 1 has a glass transition temperature in the range of ≥40 and ≤150° C., advantageously in the range of ≥60 and ≤140° C. and particularly advantageously in the range of ≥70 and ≤130° C.

In the context of this document, the glass transition temperature is generally determined to DIN EN ISO 11357-2 (2013-09) [differential thermoanalysis, midpoint temperature, heating rate 20 K/min].

It is common knowledge to the person skilled in the art that, according to Fox (T. G. Fox, Bull. Am. Phys. Soc. 1956 [Ser. II] 1, page 123 and according to Ullmann's Encyclopädie der technischen Chemie [Ullmann's Encyclopedia of Industrial Chemistry], vol. 19, page 18, 4th edition, Verlag Chemie, Weinheim, 1980), the glass transition temperature of at most lightly crosslinked copolymers can be estimated in a good approximation using the following formula:

$$1/Tg = x_1/Tg^1 + x_2/Tg^2 + \ldots x_n/Tg^n$$

where $x_1, x_2, \ldots x_n$ are the mass fractions of monomers 1, 2, ... n and $Tg^1, Tg^2, \ldots Tg^n$ are the glass transition temperatures in degrees Kelvin of the polymers synthesized from only one of the monomers 1, 2, ... n at a time. The glass transition temperatures of these homopolymers of most ethylenically unsaturated monomers are known (or can be ascertained experimentally in a simple manner known per se) and are listed, for example, in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and in Ullmann's Encyclopedia of Industrial Chemistry, page 169, Verlag Chemie, Weinheim, 1992.

In one embodiment of the invention, the at least one polymer 1 is used in particulate form with a weight-average particle size in the range of ≥10 and ≤200 nm.

In this document, the weight-average particle diameters are generally determined to ISO 13321 with a High Performance Particle Sizer from Malvern at 22° C. and a wavelength of 633 nm.

In a preferred embodiment of the invention, however, the at least one polymer 1 is used in the form of an aqueous polymer solution. In order to increase the solubility of the at least one polymer 1, or to assure it at all, the acid groups thereof are neutralized at least partly and preferably completely with a base, preferred bases used being sodium hydroxide, potassium hydroxide or ammonium hydroxide and especially preferably ammonium hydroxide. The polymer solution is advantageously prepared by first stirring the at least one polymer 1 in pulverulent form into an aqueous initial charge and then adding an aqueous base solution, especially of potassium hydroxide, sodium hydroxide or ammonium hydroxide in portions while stirring and optionally heating. The amount of base, especially sodium hydroxide, potassium hydroxide or ammonium hydroxide, and of the at least one polymer 1 is chosen here such that the at least one polymer 1 is fully dissolved and the pH of the aqueous polymer 1 solution is in the range of ≥5.0 and ≤9.0, preferably ≥6.5 and ≤8.5 and more preferably ≥7.0 and ≤8.0.

In a preferred embodiment, the weight-average molecular weight Mw of the at least one polymer 1 used in accordance with the invention is in the range of ≥1000 and ≤50 000 g/mol, advantageously ≥3000 and ≤25 000 g/mol, especially advantageously ≥5000 and ≤15 000 g/mol and particularly advantageously ≥7000 and ≤10 000 g/mol.

In this document, unless stated otherwise, the weight-average molecular weight Mw is generally determined via size exclusion chromatography (SEC) using tetrahydrofuran as eluent and internal polymer standards. The method and its performance are familiar to the person skilled in the art. Advantageously, the weight-average molecular weights are determined with tetrahydrofuran comprising 0.1% by weight of trifluoroacetic acid as eluent at a flow rate of 1 mL/min and column temperature 35° C. The aqueous polymer dispersions in the eluent are advantageously diluted to a concentration of about 2 mg of polymer per mL, this solution is filtered through a 0.2 μm filter (Sartorius Minisart SRP 25) to remove any insoluble gel content, and 100 μL of the filtered solution obtained are injected. As columns, three columns having an internal diameter of 7.5 mm are combined as follows: 5 cm precolumn (Plgel 10μ guard precolumn) followed by two series-connected 30 cm separation columns (Plgel 10μ Mixed B). Detection is advantageously effected by means of an Agilent 1100 differential refractometer, Agilent 1100 VWD UV photometer, PSS SLD7000-BI-MwA (UV/254 nm/Agilent). Calibration is familiar to the person skilled in the art and is effected with polystyrene standards having narrow distribution, for example from Polymer Laboratories with molecular weights of Mw=580 to Mw=7 500 000, and hexylbenzene (M=162).

According to the invention,

- ≤5.0% by weight of at least one α,β-monoethylenically unsaturated $C_3$ to $C_6$ mono- or dicarboxylic acid (monomers A2),
- ≥95% and ≤100% by weight of at least one ethylenically unsaturated compound other than the monomers A2 (monomers B2), are free-radically polymerized in an aqueous medium in the presence of the at least one polymer 1 by the method of a free-radically initiated aqueous emulsion polymerization, where the amounts of monomers A2 and B2 add up to 100% by weight and where the nature and amounts of monomers A2 and B2 are chosen such that the polymer 2 obtained therefrom has a Hansch parameter of ≥2.80 and a glass transition temperature ≥20° C.

The conduct of free-radically initiated emulsion polymerizations of ethylenically unsaturated compounds (monomers) in an aqueous medium has already been widely described and is therefore well known to the person skilled in the art [in this regard see Emulsionspolymerisation [Emulsion Polymerization] in Encyclopedia of Polymer Science and Engineering, volume 8, pages 659 ff. (1987); D. C. Blackley, in High Polymer Latices, volume 1, pages 35 ff. (1966); H. Warson, The Applications of Synthetic Resin Emulsions, chapter 5, pages 246 if. (1972); D. Diederich, Chemie in unserer Zeit 24, pages 135 to 142 (1990); Emulsion Polymerisation, Interscience Publishers, New York (1965); DE-A-40 03 422 and Dispersionen synthetischer Hochpolymerer [Dispersions of Synthetic High Polymers], F. Holscher, Springer-Verlag, Berlin (1969)]. The free-radically initiated aqueous emulsion polymerization is typically effected by dispersing the monomers, generally with inclusion of dispersing aids, such as emulsifiers and/or protective colloids, in aqueous medium and polymerizing them using at least one water-soluble free-radical polymerization initiator. Frequently, the residual contents of unconverted monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or further customary added substances, for example foam- or viscosity-modifying additives, are added to the aqueous polymer dispersion. The process of the invention differs from this general procedure merely in that the polymerization reaction is effected in the presence of the at least one polymer 1, where monomers A2 and B2 are chosen in terms of nature and amount such that the polymer 2 obtained therefrom has a Hansch parameter of 2.80 and a glass transition temperature ≥20° C.

The monomers A2 correspond here to the monomers A1 and the monomers B2 to the monomers B1 (as described above), except that the nature and amount of these monomers are chosen such that the polymer 2 obtained therefrom has a Hansch parameter of ≥2.80 and a glass transition temperature ≥20° C.

Monomers A2 used are preferably acrylic acid and/or methacrylic acid, and monomers B2 used are preferably styrene, α-methylstyrene, methyl methacrylate, n-butyl acrylate and/or 2-ethylhexyl acrylate.

In the preparation of the polymers 2, the total amount of monomers A2, according to the invention, is ≤5% by weight, preferably ≤2% by weight and especially preferably 0% by weight, and the total amount of monomers B2 is accordingly ≥95% by weight, preferably ≥98% by weight and especially preferably 100% by weight.

According to the invention, monomers A2 and B2 are chosen in terms of nature and amount such that the polymer 2 obtained therefrom has a Hansch parameter ≥2.80, advantageously ≥2.80 and ≤3.20 and especially advantageously ≥2.90 and ≤3.10. The Hansch parameters for the polymers 2 are calculated as described for the polymers 1.

It is essential to the invention that the polymer 2 obtained has a glass transition temperature of ≥20° C., advantageously ≥20 and ≤60° C. and especially advantageously ≥25 and ≤45° C.

According to the invention, it is important that the aforementioned monomers A2 and B2 are used individually or else as mixtures. Of the monomers A2 and B2, the entireties or portions in each case may be initially charged in the aqueous polymerization medium prior to initiation of the polymerization reaction and any remaining portions may be metered in under polymerization conditions. Advantageously in accordance with the invention, however, the entireties of monomers A2 and B2 are metered into the aqueous polymerization medium under polymerization conditions. It is possible here for monomers A2 and B2 each to be metered into the aqueous polymerization medium in individual streams, as a monomer mixture or in the form of an aqueous monomer emulsion, in a batchwise or else continuous manner at constant or varying flow rates. Particularly advantageously, monomers A2 and B2 are metered continuously into the aqueous polymerization medium as a monomer mixture at constant flow rate.

According to the invention, the weight ratio of the at least one polymer 1 to the sum of the total amounts of monomers A2 and B2 (total amount of monomer 2) is in the range from 15:85 to 60:40, advantageously from 20:80 to 50:50 and especially advantageously from 25:75 to 40:60.

The free-radically initiated aqueous emulsion polymerization for preparation of the polymers 2 is generally conducted in the presence of a free-radical polymerization initiator (free-radical initiator). Useful free-radical initiators are all those initiators that are capable of initiating a free-radical aqueous emulsion polymerization. These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis (2,4-dimethylvaleronitrile) and 2,2'-azobis(amidinopropyl) dihydrochloride (AIBA, corresponds to V-50 from Wako Chemicals). It is of course also possible to use what are called redox initiator systems as free-radical initiators. Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Initiation of the polymerization reaction is understood to mean the start of the polymerization reaction of the monomers present in the polymerization vessel after the free-radical initiator has formed free radicals. The polymerization reaction can be initiated by addition of free-radical initiator to the aqueous polymerization mixture in the polymerization vessel under polymerization conditions. Alternatively, it is possible that a portion or the entire amount of the free-radical initiator is added to the aqueous polymerization mixture comprising the initially charged monomers in the polymerization vessel under conditions unsuitable for triggering a polymerization reaction, for example at low temperature, and then polymerization conditions are established in the aqueous polymerization mixture. Polymerization conditions are generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, the polymerization temperature and the polymerization pressure are selected such that the free-radical initiator has a half life of <3 hours and especially advantageously <1 hour, and there are always sufficient starter free-radicals available to initiate and to maintain the polymerization reaction.

Useful reaction temperatures for the free-radically initiated aqueous emulsion polymerization are the entire range from 0 to 170° C. Temperatures employed are generally 50 to 120° C., preferably 60 to 110° C. and especially preferably 60 to 100° C. The free-radically initiated aqueous emulsion polymerization can be conducted at a pressure of less than, equal to or greater than 1 atm [1.013 bar (absolute), atmospheric pressure], and so the polymerization temperature may exceed 100° C. and may be up to 170° C. In the presence of monomers A1 to B3 with a low boiling point, the emulsion polymerization is preferably conducted under elevated pressure. In this case, the pressure may assume values of 1.2, 1.5, 2, 5, 10, 15 bar (absolute) or even higher values. If the emulsion polymerization is conducted under reduced pressure, pressures of 950 mbar, frequently of 900 mbar and often 850 mbar (absolute) are established.

Advantageously, the free-radical aqueous emulsion polymerization is conducted at 1 atm with exclusion of oxygen, especially under an inert gas atmosphere, for example under nitrogen or argon.

According to the invention, the total amount of the free-radical initiator may be included in the initial charge in the aqueous reaction medium prior to initiation of the polymerization reaction. Alternatively, it is optionally possible to include only a portion of the free-radical initiator in the initial charge in the aqueous reaction medium prior to initiation of the polymerization reaction, and then, under polymerization conditions, to add the total amount or any remaining residual amount in the first and/or second polymerization stage during the free-radically initiated emulsion polymerization according to its consumption in a continuous or discontinuous manner.

In general, the total amount of free-radical initiators is 0.05% and 5% by weight, preferably 0.1 and 3% by weight and more preferably 0.1% and 1.5% by weight, based in each case on the total amount of monomer 2.

The weight-average molecular weights of the polymers 2 formed can be adjusted using free-radical chain-transferring compounds (chain transfer agents). The compounds used here are essentially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and isomeric compounds thereof, n-octanethiol and isomeric compounds thereof, n-nonanethiol and isomeric compounds thereof, n-decanethiol and isomeric compounds thereof, n-undecanethiol and isomeric compounds thereof, n-dodecanethiol and isomeric compounds thereof, n-tridecanethiol and isomeric compounds thereof, substituted thiols, for example 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate, and all other sulfur compounds described in the Polymer Handbook 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another.

According to the invention, the total amount of the chain transfer agent may be included in the initial charge in the aqueous reaction medium prior to initiation of the polymerization reaction. Alternatively, it is optionally possible to include only a portion of the chain transfer agent in the initial charge in the aqueous reaction medium prior to initiation of the polymerization reaction, and then, under polymerization conditions, to add the total amount or any remaining residual amount in the first and/or second polymerization stage during the free-radically initiated emulsion polymerization as required in a continuous or discontinuous manner. It is of course possible to use different chain transfer agents in different amounts in the first polymerization stage and in the second.

In general, the total amount of chain transfer agent is $\geq 0\%$ and $\leq 5\%$ by weight, preferably $\geq 0\%$ and $\leq 2\%$ by weight and more preferably 0% and $\leq 1\%$ by weight, based in each case on the total amount of monomer 2.

Advantageously in accordance with the invention, such polymers 1 are used, in terms of nature and amount, that are dissolved in the aqueous medium under polymerization conditions. These are generally those polymers 1 wherein the carboxylic acid groups have been at least partly and preferably fully neutralized. If this is the case, these polymers 1, given a sufficient amount, act as a dispersing aid capable of maintaining dispersion both of the monomer droplets and of the polymer particles formed during the emulsion polymerization in the aqueous medium and hence assuring the stability of the aqueous polymer dispersion produced.

If, however, the dispersant action of the polymers 1 used is insufficient to maintain dispersion of the monomer droplets and of the polymer particles formed in the aqueous medium, additional dispersing aids are used in accordance with the invention. These may be not only the protective colloids usually used in the conduct of free-radical aqueous emulsion polymerization reactions, but also emulsifiers.

Suitable protective colloids are, for example, polyvinyl alcohols, cellulose derivatives or copolymers comprising vinyl pyrrolidone. A detailed description of other suitable protective colloids is found in Houben-Weyl, Methoden der organischen Chemie [Methods of Organic Chemistry], vol. XIV/1, Makromolekulare Stoffe [Macromolecular Materials], pages 411 to 420, Georg-Thieme-Verlag, Stuttgart, 1961. It is also possible, of course, to use mixtures of emulsifiers and/or protective colloids. The dispersion auxiliaries used are preferably exclusively emulsifiers whose relative molecular weights are usually below 1000, in contrast to the protective colloids. They may be either anionic, cationic, or nonionic. When mixtures of interface-active substances are used, the individual components must, of course, be compatible with one another, and in case of doubt this can be checked by a few preliminary experiments. Anionic emulsifiers are generally compatible with one another and with nonionic emulsifiers.

The same also applies to cationic emulsifiers, whereas anionic and cationic emulsifiers are mostly not compatible with one another. Commonly used emulsifiers are, for example, ethoxylated mono-, di- and trialkylphenols (EO level: 3 to 50, alkyl radical: C4 to C12), ethoxylated fatty alcohols (EO level: 3 to 50; alkyl radical: C8 to C36) and alkali metal and ammonium salts of alkyl sulfates (alkyl radical: C8 to C12), of sulfuric monoesters of ethoxylated alkanols (EO level: 4 to 30, alkyl radical: C12 to C18) and ethoxylated alkylphenols (EO level: 3 to 50, alkyl radical: C4 to C12), of alkylsulfonic acids (alkyl radical: C12 to C18) and of alkylarylsulfonic acids (alkyl radical: C9 to C18). Other suitable emulsifiers are found in Houben-Weyl, Methoden der organischen Chemie, vol. XIV/1, Makromolekulare Stoffe, pages 192 to 208, Georg-Thieme-Verlag, Stuttgart, 1961.

Further useful interface-active substances have been found to be compounds of the general formula I

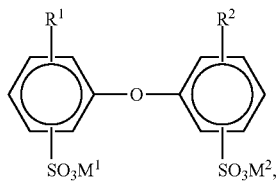

in which $R^1$ and $R^2$ are hydrogen atoms or $C_4$- to $C_{24}$-alkyl and are not both hydrogen atoms, and $M^1$ and $M^2$ may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen, where $R^1$ and $R^2$ are not both simultaneously hydrogen atoms. $M^1$ and $M^2$ are preferably sodium, potassium or ammonium, more preferably sodium. Particularly advantageous compounds of the general formula I are those in which $M^1$ and $M^2$ are sodium, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds of the general formula III are common knowledge, for example from U.S. Pat. No. 4,269,749, and are commercially available.

If dispersing aids are used in accordance with the invention, anionic and/or nonionic and especially advantageously anionic surfactants are advantageously used.

In general, the total amount of optional additional dispersing aids is ≥0.05% and ≤3% by weight, preferably ≥0.1 and ≤2% by weight and more preferably ≥0.5% and ≤1.5% by weight, based in each case on the total amount of monomer 2.

Particularly advantageously according to the invention, however, no additional dispersing aids are used.

The aqueous polymer dispersion obtained after the polymerization comprises polymer particles having a weight-average particle diameter in the range of ≥10 and ≤800 nm, advantageously in the range of ≥20 and ≤400 nm and especially in the range of ≥30 and ≤100 nm.

According to the invention, the aqueous polymer dispersions obtained can be dried, which means that polymer powders are obtainable. Corresponding drying methods, for example freeze-drying or spray drying, are familiar to those skilled in the art.

It will be appreciated that, in a preferred embodiment, the aqueous polymer dispersions obtainable by the process of the invention and the polymer powders obtainable by drying thereof are embraced.

It is also significant that the aqueous polymer dispersions obtainable by the process of the invention and the polymer powders obtainable by drying thereof are advantageously suitable for use as binder in the production of adhesives, sealants, renders, paper coating slips, fiber nonwovens, flexible roof coatings and paints, and in sand consolidation, as a component in the production of textile or leather auxiliaries and impact modifiers, or for modification of mineral binders and plastics.

Advantageously in accordance with the invention, the aqueous polymer dispersions of the invention and the polymer powders of the invention are used for production of aqueous formulations such as, in particular, coating compositions or paints that are advantageously suitable for coating of wood, wood veneer, wood fiberboards or cork surfaces, paper, paperboard, cardboard, textile, leather, fleece, plastics surfaces (for example polyamide, acrylonitrile-butadiene-styrene copolymers, polycarbonate, acrylonitrile-butadiene-styrene copolymer/polycarbonate mixtures, polypropylene, mixtures of polypropylene and ethylene-propylene-butadiene copolymers, polystyrene or polyvinyl chloride), glass, ceramic, mineral building materials, metals and coated metals.

The aqueous polymer dispersions obtainable in accordance with the invention and the polymer powders obtainable therefrom are advantageously used as binders in aqueous formulations which also comprise at least one pigment. The invention therefore also includes pigmented aqueous formulations, such as, in particular, water-based coating compositions or paints which comprise at least one aqueous polymer dispersion of the invention and/or at least one polymer powder obtainable therefrom as binder.

Pigments used may in principle be any white or color pigments familiar to the person skilled in the art. According to CD Rompp Chemie Lexikon—Version 1.0, Stuttgart/New York: Georg Thieme Verlag 1995 with reference to DIN 55943, pigments are understood to mean particulate inorganic or organic, colored or uncolored colorants that are virtually insoluble in the application medium.

Titanium dioxide in its various polymorphs should be mentioned as the most important white pigment owing to its high refractive index (rutile: 2.70 and anatase: 2.55) and its good hiding power. Alternatively, zinc oxide and zinc sulfide are used as white pigments. These white pigments may be used in surface-coated or uncoated form. Alternatively, organic white pigments are also used, for example non-filming hollow polymer particles that are rich in styrene and carboxyl groups and have a particle size of about 300 to 400 nm (called opaque particles).

As well as white pigments, coloring can be accomplished using a wide variety of different color pigments that are familiar to those skilled in the art, for example the somewhat less costly inorganic iron oxides or sulfides, cadmium oxides or sulfides, chromium oxides or sulfides and lead oxides or sulfides, lead molybdate, cobalt blue or carbon black, and the somewhat more costly organic pigments, for example phthalocyanines, azo pigments, quinacridones, perylenes or carbazoles. Preferably in accordance with the invention, however, titanium dioxide, especially in its rutile form, is used as at least one pigment.

It will be appreciated that the aqueous formulations, especially the coating compositions or paints, in the context of the present invention, according to the end use, may also comprise further customary auxiliaries that are familiar to the person skilled in the art in terms of nature and amount, for example fillers, soluble dyes, optical brighteners, retention agents, wetting agents, film-forming auxiliaries, defoamers, preservatives, biocides, slime control agents, plasticizers, antiblocking agents, antistats, buffer substances, hydrophobizing agents, etc.

Fillers used are essentially inorganic materials having a lower refractive index compared to the pigments (white fillers, according to DIN 55943 and DIN 55945, have refractive index values <1.7). The pulverulent fillers are frequently naturally occurring minerals, for example calcite, chalk, dolomite, kaolin, talc, mica, diatomaceous earth, baryte, quartz or talc/chlorite assemblages, but also synthetically produced inorganic compounds, for example precipitated calcium carbonate, calcined kaolin or barium sulfate, and fumed silica. The filler used is preferably calcium carbonate in the form of crystalline calcite or of amorphous chalk.

Optionally, the aqueous formulations may also comprise at least one organic solvent that preferably acts as a film-forming auxiliary. Useful examples for this purpose include aromatic hydrocarbons, such as solvent naphtha, benzene, toluene, xylene, or mixtures of aromatic hydrocarbons as sold, for example, as Solvesso® 100, 150 or 200, chlorobenzene, esters such as ethyl acetate, butyl acetate, methylglycol acetate, ethylglycol acetate, methoxypropyl acetate, 2,2,4-trimethylpentane-1,3-diol monoisobutyrate (Texanol® from Eastman), dipropylene glycol monomethyl ether acetate, propylene glycol monoethyl ether acetate, propylene glycol monomethyl ether acetate, ethers such as butylglycol, tetrahydrofuran, dioxane, ethylglycol ether, diethylene glycol monoethyl ether, diethylene glycol monomethyl ether, diethylene glycol mono-n-butyl ether, diethylene glycol mono-n-hexyl ether, diethylene glycol diethyl ether, diethylene glycol dimethyl ether, diethylene glycol di-n-butyl ether, diethylene glycol di-n-hexyl ether, ethylene glycol di-2-ethylhexyl ether, ethylene glycol di-n-butyl ether, ethylene glycol di-n-hexyl ether, ethylene glycol di-n-propyl ether, dipropylene glycol dimethyl ether, dipropylene glycol monomethyl ether, dipropylene glycol mono-n-butyl ether, dipropylene glycol mono-n-propyl ether, dipropylene glycol mono-tert-butyl ether, dipropylene glycol di-tert-butyl ether, propylene glycol monoethyl ether, propylene glycol monomethyl ether, propylene glycol mono-n-propyl ether, propylene glycol monophenyl ether, propylene glycol mono-tert-butyl ether, propylene glycol diphenyl ether, propylene glycol mono-n-butyl ether, tripropylene glycol monomethyl ether and poly(allyl glycidyl ether), ketones such as acetone, methyl ethyl ketone, halogenated organic solvents such as methylene chloride or trichloromonofluoroethane or other organic solvents, for example benzyl alcohol, dibutyl phthalate, propylene glycol, tris(butoxyethyl) phosphate.

Film-forming auxiliaries are used especially in order to lower the minimum film-forming temperature of the emulsion polymers and hence to contribute to good film formation.

The aqueous formulations of the invention generally have a pigment volume concentration of $\geq 1\%$ and $\leq 60\%$, advantageously $\geq 5\%$ and $\leq 50\%$ and especially advantageously $\geq 10\%$ and $\leq 40\%$. Pigment volume concentration (PVC) is understood here to mean the volume of the pigments and fillers multiplied by 100, divided by the volume of the binder polymer plus the volume of the pigments and fillers.

$$\% PVC = \frac{\text{Volume of the pigments and fillers}}{\text{Volume of the binder polymer} + \text{volume of the pigments and fillers}}$$

It is of particular significance that the invention is also to encompass aqueous formulations, especially coating formulations for specific fields of use, such as, in particular, concealing wood varnishes comprising (calculated as solids)

| | |
|---|---|
| $\geq 15\%$ and $\leq 60\%$ by weight | of total polymer (=sum of polymer 1 and polymer 2) |
| $\geq 0\%$ and $\leq 20\%$ by weight | of film-forming auxiliaries |
| $\geq 1\%$ and $\leq 40\%$ by weight | of pigments |
| $\geq 0\%$ and $\leq 50\%$ by weight | of fillers |
| $\geq 0.1\%$ and $\leq 5\%$ by weight | of dispersing aids |
| $\geq 0\%$ and $\leq 20\%$ by weight | of thickeners, and |
| $\geq 0\%$ and $\leq 30\%$ by weight | of further auxiliaries, such as buffer substances, biocides etc., | or paper coating slips comprising (calculated as solids)

| | |
|---|---|
| $\geq 5\%$ and $\leq 15\%$ by weight | of total polymer |
| $\geq 0\%$ and $\leq 8\%$ by weight | of starch, and |
| $\geq 85\%$ and $\leq 95\%$ by weight | of fillers | based in each case on the solids content of the aqueous coating formulations mentioned.

It is significant that the aqueous formulations are advantageously adjusted with a base, especially ammonia or aqueous ammonia solution, to a pH in the range of 7.5 and 10.0 and particularly advantageously 8.0 and 9.0.

Advantageously, the aqueous formulations, especially coating compositions or paints, are first applied to the surface of a substrate and then dried at a temperature T equal to or greater than the minimum film-forming temperature (MFT) [T≥MFT] of the aqueous polymer dispersion of the invention or aqueous formulation thereof. Advantageously, the drying temperature T≥(MFT+5) ° C., particularly advantageously T≥(MFT+10) ° C. and especially T≥(MFT+20) ° C.

In the context of this document, the MFT is understood to mean the temperature determined experimentally according to DIN ISO 2115 of April 2001, below which the aqueous polymer dispersion does not form a continuous polymer film.

It is of significance in accordance with the invention that the amount of aqueous formulation is chosen such that the coating applied to the substrate, after drying, has a layer thickness of $\leq 2$ mm, advantageously $\geq 0.01$ and $\leq 1.5$ mm and especially advantageously $\geq 0.05$ and $\leq 0.5$ mm. It will be appreciated that it is possible in accordance with the invention that two or more identical or different coating layers can be applied successively to a substrate.

According to the invention, all natural or synthetic, organic or inorganic substrates can be used for coating. In a preferred embodiment, however, substrates used with preference are preferably those having a hydrophilic surface, for example metal, glass, porcelain, paper, paperboard, plastics, concrete or wood.

In the context of the present document, a substrate has a hydrophilic surface when, at a temperature of 20° C. and atmospheric pressure (1.013 bar absolute), the contact angle of a droplet of deionized water applied to a horizontal flat surface of a substrate, immediately after application thereof, forms a contact angle <90° with the surface of the substrate [interfacial tension of the substrate with respect to the environment is greater than the interfacial tension of water with respect to the environment].

It is also of significance that the aqueous formulations of the invention are especially suitable for production of coatings having high solvent stability and low tendency to soiling or high resistance to staining.

The invention is to be elucidated by nonlimiting examples which follow.

EXAMPLES

1 Preparation of Aqueous Polymer 1 Solutions

The inventive acid-rich polymers P1-A to P1-C and the noninventive acid-rich polymers P1-V were prepared analogously to the procedure described in U.S. Pat. No. 4,529,787.

The monomer compositions of the polymers P1 and the characterization thereof are listed in table 1.

TABLE 1

Monomer composition, molar mass, Hansch parameter and Tg of the polymers P1

| Polymer | Styrene [% by wt.] | alpha-Methylstyrene [% by wt.] | Acrylic acid [% by wt.] | Methyl methacrylate [% by wt.] | n-Butyl acrylate [% by wt.] | Ethylhexyl acrylate [% by wt.] | Molar mass Mw [g/mol] | Hansch parameter | Tg [° C.] |
|---|---|---|---|---|---|---|---|---|---|
| P1-A | 27.5 | 0 | 10.6 | 47.9 | 14.0 | 0 | 9000 | 1.46 | 81 |
| P1-B | 31.7 | 37.1 | 31.2 | 0 | 0 | 0 | 8500 | 1.43 | 127 |
| P1-C | 15.4 | 39.0 | 20.2 | 0 | 25.4 | 0 | 7000 | 1.86 | 72 |
| P1-V | 22.7 | 35.2 | 36.2 | 0 | 0 | 5.9 | 9200 | 1.23 | 117 |

Polymers P1-A to P1-V were used to prepare ammoniacal aqueous solutions as follows: For this purpose, at room temperature (20 to 25° C.), a stirred vessel was initially charged with 700 g of deionized water, and 300 g of the respective solid polymer P1 in powder form were added in portions. Subsequently, the amounts of 25% by weight aqueous ammonia solution specified in table 2 were added gradually to the polymer suspension and the aqueous polymer mixture was stirred at room temperature for 30 min. Subsequently, the aqueous polymer mixtures thus obtained were heated to 80° C. and stirred at this temperature for 2 hours. After cooling to room temperature and filtration through a 125 μm filter, slightly cloudy to clear solutions were obtained. The aqueous polymer solutions obtained are called PL1-A to PL1-C and PL1-V.

TABLE 2

Preparation of the polymer solutions

| Polymer | Amount of 25% by weight aqueous ammonia solution added [g] | Solids content [% by wt.] | Name |
|---|---|---|---|
| P1-A | 18.8 | 29.6 | PL1-A |
| P1-B | 65.2 | 29.8 | PL1-B |
| P1-C | 37.1 | 29.7 | PL1-C |
| P1-V | 73.5 | 29.5 | PL1-V |

2 Preparation of the Aqueous Polymer Dispersions

Aqueous Polymer Dispersion 1 (B1)

A glass polymerization vessel equipped with metering devices and closed-loop temperature control was initially charged at room temperature under a nitrogen atmosphere with

| | |
|---|---|
| 357.1 g | deionized water |
| 533.9 g | polymer solution PL1-A | and heated to 80° C. while stirring. On attainment of this temperature, 34.0 g a 7% by weight aqueous solution of sodium peroxodisulfate were added within one minute and then the mixture was stirred while maintaining this temperature for 5 minutes. Thereafter, feed 1 was metered in continuously at constant metering rate over the course of 120 minutes. After feed 1 had ended, feed 2 was added all at once, then polymerization was continued for 60 minutes.

Feed 1 (Homogeneous Monomer Mixture of)

| | |
|---|---|
| 269.1 g | styrene |
| 104.6 g | 2-ethylhexyl acrylate |

Feed 2

| | |
|---|---|
| 25.0 g | deionized water |

After the further polymerization time had ended, the aqueous polymer dispersion obtained was cooled down to room temperature, 0.6 g of a 5% by weight aqueous solution of Acticid® MBS (a biocide from Thor GmbH) and 16.4 g of deionized water were added, and the mixture was filtered through a 125 μm filter.

The aqueous polymer dispersion 1 obtained had a solids content of 40.0% by weight and a pH of 7.3. The weight-average particle diameter was 58 nm. The Hansch parameter of polymer 2 formed from feed 1 was calculated as 3.23. The glass transition temperature of polymer 2 was determined as 39° C.

In the context of this document, the solids contents were generally determined by drying a defined amount of the aqueous polymer dispersion (about 0.8 g) to constant weight at a temperature of 130° C. using a Mettler Toledo HR73 moisture analyzer. Two measurements are conducted in each case, and the average of these two measurements is reported.

The weight-average particle sizes were generally determined to ISO 13321 with a High Performance Particle Sizer from Malvern at 22° C. and a wavelength of 633 nm.

The pH was generally determined by means of a calibrated InPro® 325X pH electrode from Mettler-Toledo GmbH.

The glass transition temperatures were generally determined to DIN EN ISO 11357-2 (2013-09) via differential scanning calorimetry (DSC) with a heating rate of 20 K/min by means of a DSC Q2000 from TA Instruments. The midpoint temperatures were used here for the determination.

Aqueous Polymer Dispersion 2 (B2)

The aqueous polymer dispersion 2 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 143.2 g | deionized water |
| 571.7 g | polymer solution PL1-A |

Amount of 7% by weight aqueous solution of sodium peroxodisulfate: 29.0 g

Feed 1 (Homogeneous Mixture of)

| | |
|---|---|
| 203.8 g | styrene |
| 57.3 g | 2-ethylhexyl acrylate |
| 57.3 g | n-butyl acrylate |

Feed 2

| | |
|---|---|
| 22.9 g | deionized water |

Amount of 5% by weight aqueous solution of Acticid® MBS: 0.6 g

Amount of deionized water: 15.1 g

The aqueous polymer dispersion 2 obtained had a solids content of 44.6% by weight and a pH of 7.4. The weight-average particle diameter was 80 nm. The Hansch parameter of polymer 2 formed from feed 1 was calculated as 2.98. The glass transition temperature of polymer 2 was determined as 29° C.

Aqueous Polymer Dispersion 3 (B3)

The aqueous polymer dispersion 3 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 87.9 g | deionized water |
| 653.3 g | polymer solution PL1-A |

Amount of 7% by weight aqueous solution of sodium peroxodisulfate: 26.7 g

Feed 1 (Homogeneous Mixture of)

| | |
|---|---|
| 188.2 g | styrene |
| 52.9 g | 2-ethylhexyl acrylate |
| 52.9 g | n-butyl acrylate |

Feed 2

| | |
|---|---|
| 22.9 g | deionized water |

Amount of 5% by weight aqueous solution of Acticid® MBS: 0.6 g

Amount of deionized water: 15.1 g

The aqueous polymer dispersion 3 obtained had a solids content of 44.8% by weight and a pH of 7.6. The weight-average particle diameter was 83 nm. The Hansch parameter of polymer 2 formed from feed 1 was calculated as 2.98. The glass transition temperature of polymer 2 was determined as 29° C.

Aqueous Polymer Dispersion 4 (B4)

The aqueous polymer dispersion 3 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 226.0 g | deionized water |
| 641.0 g | polymer solution PL1-C |

Amount of 7% by weight aqueous solution of sodium peroxodisulfate: 54.0 g

Feed 1 (Homogeneous Mixture of)

| | |
|---|---|
| 239.2 g | styrene |
| 67.3 g | 2-ethylhexyl acrylate |
| 67.3 g | n-butyl acrylate |

Feed 2

| | |
|---|---|
| 25.0 g | deionized water |

Amount of 5% by weight aqueous solution of Acticid® MBS: 0.6 g

Amount of deionized water: 16.4 g

The aqueous polymer dispersion 3 obtained had a solids content of 39.5% by weight and a pH of 7.7. The weight-average particle diameter was 70 nm. The Hansch parameter of polymer 2 formed from feed 1 was calculated as 2.98. The glass transition temperature of polymer 2 was determined as 29° C.

Aqueous Polymer Dispersion 5 (B5)

The aqueous polymer dispersion 5 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 216.3 g | deionized water |
| 533.9 g | polymer solution PL1-A |

Amount of 7% by weight aqueous solution of sodium peroxodisulfate: 34.0 g

Feed 1 (Homogeneous Mixture of)

| | |
|---|---|
| 263.8 g | styrene |
| 52.3 g | 2-ethylhexyl acrylate |
| 52.3 g | n-butyl acrylate |
| 5.3 g | hexane-1,6-diol diacrylate |

Feed 2

| | |
|---|---|
| 25.0 g | deionized water |

Amount of 5% by weight aqueous solution of Acticid® MBS: 0.6 g

Amount of deionized water: 16.4 g

The aqueous polymer dispersion 5 obtained had a solids content of 44.4% by weight and a pH of 7.6. The weight-average particle diameter was 77 nm. The Hansch parameter of polymer 2 formed from feed 1 was calculated as 2.98. The glass transition temperature of polymer 2 was determined as 42° C.

Aqueous Polymer Dispersion 6 (B6)

The aqueous polymer dispersion 6 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 325.1 g | deionized water |
| 480.5 g | polymer solution PL1-A |

Amount of 7% by weight aqueous solution of sodium peroxodisulfate: 30.9 g

Feed 1 (Homogeneous Mixture of)

| | |
|---|---|
| 216.2 g | styrene |
| 57.7 g | 2-ethylhexyl acrylate |
| 62.5 g | n-butyl acrylate |

Feed 2

| | |
|---|---|
| 22.5 g | deionized water |

Amount of 5% by weight aqueous solution of Acticid® MBS: 0.6 g

Amount of deionized water: 14.8 g and an additional 1.2 g of a 25% by weight aqueous ammonia solution The aqueous polymer dispersion 6 obtained had a solids content of 39.6% by weight and a pH of 8.0. The weight-average particle diameter was 94 nm. The Hansch parameter of polymer 2 formed from feed 1 was calculated as 3.07. The glass transition temperature of polymer 2 was determined as 30° C.

Aqueous Comparative Dispersion 1 (VB1)

The aqueous comparative dispersion 1 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 316.2 g | deionized water |
| 478.9 g | polymer solution PL1-V |

Amount of 7% by weight aqueous solution of sodium peroxodisulfate: 38.3 g

Feed 1 (Homogeneous Mixture of)

| | |
|---|---|
| 269.1 g | styrene |
| 104.6 g | 2-ethylhexyl acrylate |

Feed 2

| | |
|---|---|
| 22.5 g | deionized water |

Amount of 5% by weight aqueous solution of Acticid® MBS: 0.6 g mount of deionized water: 14.8 g The aqueous comparative dispersion 1 obtained had a solids content of 41.5% by weight and a pH of 7.9. The weight-average particle diameter was 350 nm. The Hansch parameter of polymer 2 formed from feed 1 was calculated as 3.23. The glass transition temperature of polymer 2 was determined as 39° C.

Aqueous Comparative Dispersion 2 (VB2)

The aqueous comparative dispersion 2 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 216.3 g | deionized water |
| 533.9 g | polymer solution PL1-A |

Amount of 7% by weight aqueous solution of sodium peroxodisulfate: 34.0 g

Feed 1 (Homogeneous Mixture of)

| | |
|---|---|
| 261.6 g | methyl methacrylate |
| 112.1 g | n-butyl acrylate |

Feed 2

| | |
|---|---|
| 25.0 g | deionized water |

Amount of 5% by weight aqueous solution of Acticid® MBS: 0.6 g

Amount of deionized water: 16.4 g

The aqueous comparative dispersion 2 obtained had a solids content of 44.5% by weight and a pH of 7.6. The weight-average particle diameter was 78 nm. The Hansch parameter of polymer 2 formed from feed 1 was calculated as 1.56. The glass transition temperature of polymer 2 was determined as 44° C.

Aqueous Comparative Dispersion 3 (VB3)

The aqueous comparative dispersion 3 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 227.9 g | deionized water |
| 608.6 g | polymer solution PL1-A |

Amount of 7% by weight aqueous solution of sodium peroxodisulfate: 34.3 g

Feed 1 (Homogeneous Mixture of)

| | |
|---|---|
| 115.3 g | methyl methacrylate |
| 67.3 g | styrene |
| 62.5 g | 2-ethylhexyl acrylate |
| 52.9 g | n-butyl acrylate |

Feed 2

| | |
|---|---|
| 22.5 g | deionized water |

Amount of 5% by weight aqueous solution of Acticid® MBS: 0.6 g

Amount of deionized water: 14.8 g and additionally 1.9 g of a 25% by weight aqueous ammonia solution The aqueous comparative dispersion 3 obtained had a solids content of 39.5% by weight and a pH of 7.6. The weight-average particle diameter was 65 nm. The Hansch parameter of polymer 2 formed from feed 1 was calculated as 2.40. The glass transition temperature of polymer 2 was determined as 24° C.

Aqueous Comparative Dispersion 4 (VB4)

The aqueous comparative dispersion 4 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 295.8 g | deionized water |
| 497.1 g | polymer solution PL1-B |

Amount of 7% by weight aqueous solution of sodium peroxodisulfate: 38.3 g

Feed 1 (Homogeneous Mixture of)

| | |
|---|---|
| 134.5 g | styrene |
| 100.9 g | 2-ethylhexyl acrylate |
| 100.9 g | n-butyl acrylate |

Feed 2

| | |
|---|---|
| 25.0 g | deionized water |

Amount of 5% by weight aqueous solution of Acticid® MBS: 0.6 g

Amount of deionized water: 14.8 g and additionally 1.4 g of a 25% by weight aqueous ammonia solution The aqueous comparative dispersion 4 obtained had a solids content of 40.3% by weight and a pH of 7.6. The weight-average particle diameter was 61 nm. The Hansch parameter of polymer 2 formed from feed 1 was calculated as 3.04. The glass transition temperature of polymer 2 was determined as −7° C.

Aqueous Comparative Dispersion 5 (VB5)

The aqueous comparative dispersion 5 was prepared entirely analogously to the preparation of the aqueous polymer dispersion 1, except that the following initial charge, amount of sodium peroxodisulfate, feeds 1 and 2, biocide solution and deionized water were used:

Initial Charge

| | |
|---|---|
| 216.3 g | deionized water |
| 533.9 g | polymer solution PL1-A |

Amount of 7% by weight aqueous solution of sodium peroxodisulfate: 34.0 g

Feed 1 (Homogeneous Mixture of)

| | |
|---|---|
| 129.2 g | methyl methacrylate |
| 129.2 g | styrene |
| 57.7 g | 2-ethylhexyl acrylate |
| 57.7 g | n-butyl acrylate |

Feed 2

| | |
|---|---|
| 25.0 g | deionized water |

Amount of 5% by weight aqueous solution of Acticid® MBS: 0.6 g

Amount of deionized water: 16.4 g

The aqueous comparative dispersion 5 obtained had a solids content of 44.6% by weight and a pH of 7.5. The weight-average particle diameter was 99 nm. The Hansch parameter of polymer 2 formed from feed 1 was calculated as 2.41. The glass transition temperature of polymer 2 was determined as 38° C.

3 Production of the Varnish Formulations

For production of the varnish formulations, the aqueous polymer dispersions B1 to B6 and VB1 to VB5 were adjusted to a solids content of 39.0% by weight while stirring and with addition of deionized water.

Subsequently, 60 g in each case of these aqueous polymer dispersions thus obtained formed an initial charge at room temperature in a plastic container of capacity 0.5 L that had a diameter of 80 mm. The following were added successively in each case to the initial charges of aqueous polymer dispersions thus formed: 2.0 g of Joncryl® HPD 296 from BASF as dispersant, 0.7 g of FoamStar® SI 2180 from BASF as defoamer, 44.0 g of Kronos® 2190 from Kronos International as titanium dioxide pigment and 0.4 g of Rheovis® PU 1250 from BASF as thickener.

Subsequently, 320 g of dispersing beads having a diameter of 3 mm made of soda-lime glass were added to the formulations thus obtained, and the mixtures thus obtained were stirred with a Teflon disk having a diameter of 60 mm having a circumferential speed of 7 m/s for 10 min.

The following were then added to these mixtures with further stirring: 78 g of the respective aqueous polymer dispersion diluted to 39.0% by weight, 12.2 g of ethylene glycol butyl ether as film-forming auxiliary, 0.8 g of Rheovis® PU 1250 and 1.9 g of deionized water. Subsequently, the respective varnish formulations were adjusted to a pH of 8.0 to 8.2 with a 10% by weight aqueous ammonia solution. Stirring of the varnish formulations thus obtained was continued for another 5 minutes, and then the dispersing beads were filtered off. Prior to the performance tests, the varnish formulations thus obtained were left to stand for at least 1 hour.

The aqueous varnish formulations thus obtained from the aqueous polymer dispersions B1 to B6 and VB1 to VB5 are referred to hereinafter as varnishes LB1 to LB6 (inventive) and LVB1 to LVB5 (noninventive).

4 Performance Tests

Testing of chemical resistances or resistance to staining was effected on test boards that had been coated with the varnishes produced. For this purpose, beech test boards (veneered) were coated by means of an applicator frame with the respective varnish LB1 to LB6 and LVB1 to LVB5 in a layer thickness of 150 µm (wet). Subsequently, the test boards were dried under standard climatic conditions (23° C. and 50% relative air humidity) for 30 days. The testing for chemical resistances or resistance to staining was effected to DIN 68861-1. This involved placing filter papers (diameter: 3 cm; basis weight: 500 g/m$^2$) soaked with the test liquids onto the surface to be tested. To suppress evaporation, small plastic beakers having an internal diameter of 3.5 cm and a height of 1.5 cm were placed over the filter papers. Test liquids used were a 48% by volume aqueous ethanol solution and a coffee solution, cooled to room temperature, prepared by dissolving 2.0 g of the instant coffee "Nescafe Gold" in 100 mL of boiling tap water. The filter papers soaked with the alcohol solution or the coffee were then placed onto the varnished test boards at room temperature, the plastic beakers were placed over them, and the change in the respective varnishes was visually assessed after 1 hour in the case of the alcohol solution and after 16 hours in the case of the coffee solution (after removal of the soaked filter papers). The visual assessment was made by the following rating/grade system:

| | |
|---|---|
| No visible changes in gloss and color; the structure of the test area is unchanged | Grade 5 |
| Changes just apparent in gloss and color; the structure of the test area is unchanged | Grade 4 |
| Slight changes in gloss and color; the structure of the test area is unchanged | Grade 3 |
| Significant changes in gloss and color; the structure of the test area is unchanged | Grade 2 |
| Significant changes in gloss and color; the structure of the test area is changed | Grade 1 |
| Significant changes in gloss and color; the structure of the test area is significantly changed | Grade 0 |

3 soaked filter papers with alcohol solution and coffee solution were used for each varnish. The results reported in table 3 are the averages from these 3 visual assessments.

TABLE 3

Results from the visual assessments of varnishes LB1 to LVB5

| Varnish | Coffee | Ethanol 5 |
|---|---|---|
| LB1 | 5 | 4 |
| LB2 | 5 | 4 |
| LB3 | 5 | 4 |
| LB4 | 5 | 4 |
| LB5 | 5 | 4 |
| LB6 | 5 | 4 |

TABLE 3-continued

Results from the visual assessments of varnishes LB1 to LVB5

| Varnish | Coffee | Ethanol 5 |
|---------|--------|-----------|
| LVB1 | 3 | 2 |
| LVB2 | 3 | 1 |
| LVB3 | 3 | 1 |
| LVB4 | 2 | 2 |
| LVB5 | 3 | 2 |

It is clearly apparent from the results that the varnishes produced with the aqueous polymer dispersions of the invention have excellent resistances to coffee with simultaneously very good resistances to aqueous ethanol.

The invention claimed is:

1. A process for producing an aqueous polymer dispersion by free-radically initiated aqueous emulsion polymerization, the process comprising:
   free-radically polymerizing, in an aqueous medium, in the presence of at least one polymer 1,
   ≤5.0% by weight of monomer A2, which is at least one α,β-monoethylenically unsaturated $C_3$ to $C_6$ mono- or dicarboxylic acid, and
   ≥95% and ≤100% by weight of monomer B2, which is at least one ethylenically unsaturated compound other than the monomer A2,
   where the amounts of monomers A2 and B2 add up to 100% by weight, thereby obtaining polymer 2,
   wherein
   the monomers A2 and B2 are chosen such that the polymer 2 obtained therefrom has a Hansch parameter ≥2.80 and a glass transition temperature ≥20° C.,
   the at least one polymer 1 comprises, in copolymerized form,
   ≥3.0% and ≤35% by weight of monomer A1, which is at least one α,β-monoethylenically unsaturated $C_3$ to $C_6$ mono- or dicarboxylic acid, and
   ≥65% and ≤97.0% by weight of monomer B1, which is at least one ethylenically unsaturated compound other than the monomers A1,
   where the amounts of monomers A1 and B1 add up to 100% by weight,
   the monomers A1 and B1 are chosen such that the at least one polymer 1 has a Hansch parameter >1.35 to ≤2.00, and
   a weight ratio of the at least one polymer 1 to a total amounts of monomers A2 and B2 is in the range of 15:85 to 60:40.

2. The process according to claim 1, wherein the monomers A1 and B1 are chosen such that the at least one polymer 1 has a Hansch parameter in the range of 1.40 to 2.00.

3. The process according to claim 1, wherein the monomers A2 and B2 are chosen such that the polymer 2 obtained therefrom has a Hansch parameter in the range of 2.80 to 3.20.

4. The process according to claim 1, wherein the at least one polymer 1 comprises, in copolymerized form,
   ≥4.0% and ≤25% by weight of at least one monomer A1, and
   ≥75% and ≤96.0% by weight of at least one monomer B1.

5. The process according to claim 1, wherein the monomers A2 and B2 are chosen such that the polymer 2 obtained has a glass transition temperature of 20° C. to 60° C.

6. The process according to claim 1, wherein no monomers A2 are used.

7. The process according to claim 1, wherein the at least one polymer 1 comprises, in copolymerized form,
   acrylic acid and/or methacrylic acid as the monomers A1, and
   styrene, α-methylstyrene, methyl methacrylate, n-butyl acrylate and/or 2-ethylhexyl acrylate as the monomers B1.

8. The process according to claim 1, wherein the monomers B2 are styrene, a-methylstyrene, methyl methacrylate, n-butyl acrylate, ethylhexyl acrylate, or a combination thereof.

9. An aqueous polymer dispersion, obtained by the process according to claim 1.

10. A polymer powder, obtained by drying the aqueous polymer dispersion according to claim 9.

11. An aqueous formulation, comprising
    the aqueous polymer dispersion according to claim 9 and/or a polymer powder obtained by drying the aqueous polymer dispersion and
    at least one pigment.

12. The aqueous formulation according to claim 11, having a pigment volume concentration in the range of 1% to 60%.

13. The aqueous formulation according to claim 11, comprising titanium dioxide as the at least one pigment.

14. A method for producing a coating, the method comprising:
    preparing the coating using the aqueous formulation according to claim 11.

* * * * *